United States Patent
Lunney et al.

(10) Patent No.: US 9,682,764 B2
(45) Date of Patent: Jun. 20, 2017

(54) APPARATUS AND METHOD FOR STIFFENERS

(71) Applicant: GKN Aerospace Services Limited, East Cowes (GB)

(72) Inventors: Gavin Lunney, East Cowes (GB); Alan McMillan, East Cowes (GB)

(73) Assignee: GKN Aerospace Services Limited, East Cowes (GB)

( * ) Notice: Subject to any disclaimer, the term of this patent is extended or adjusted under 35 U.S.C. 154(b) by 0 days.

(21) Appl. No.: 14/423,795

(22) PCT Filed: Aug. 27, 2013

(86) PCT No.: PCT/GB2013/052241
§ 371 (c)(1),
(2) Date: Feb. 25, 2015

(87) PCT Pub. No.: WO2014/033440
PCT Pub. Date: Mar. 6, 2014

(65) Prior Publication Data
US 2015/0203186 A1     Jul. 23, 2015

(30) Foreign Application Priority Data
Aug. 29, 2012    (GB) .................................. 1215361.5

(51) Int. Cl.
*B64C 1/06* (2006.01)
*B64C 1/12* (2006.01)
(Continued)

(52) U.S. Cl.
CPC ................ *B64C 1/12* (2013.01); *B29C 65/54* (2013.01); *B29C 65/564* (2013.01); *B29C 65/72* (2013.01); *B29C 66/004* (2013.01); *B29C 66/112* (2013.01); *B29C 66/131* (2013.01); *B29C 66/1312* (2013.01); *B29C 66/343* (2013.01); *B29C 66/474* (2013.01); *B29C 66/524* (2013.01); *B29C 66/721* (2013.01); *B29C 70/24* (2013.01); *B29D 99/0014* (2013.01); *B64C 1/064* (2013.01); *B29C 65/483* (2013.01); *B29C 65/4835* (2013.01); *B29C 66/71* (2013.01); *B29C 66/7212* (2013.01); *B29C 66/72141* (2013.01); *B29K 2063/00* (2013.01);
(Continued)

(58) Field of Classification Search
CPC ....... Y10T 428/24174; Y10T 156/1002; B64C 1/06; B64C 1/12; B64C 1/064; B29C 66/004
See application file for complete search history.

(56) References Cited

U.S. PATENT DOCUMENTS

| 6,306,239 | B1 | 10/2001 | Breuer et al. |
| 2010/0139847 | A1 | 6/2010 | Law et al. |
| 2010/0178454 | A1 | 7/2010 | Brufau Redondo |

FOREIGN PATENT DOCUMENTS

| DE | 102008029518 A1 | 12/2009 |
| WO | 9959802 A1 | 11/1999 |
| WO | 2011121340 A1 | 10/2011 |

OTHER PUBLICATIONS

International Search Report for PCT/GB2013/052241 dated Jan. 3, 2014 (5 pages).

*Primary Examiner* — Alexander Thomas
(74) *Attorney, Agent, or Firm* — Bejin Bieneman PLC (57) ABSTRACT

An isolation layer is arranged between two adjacent upright portions of a T-section stiffener, which is arranged on and bonded to a surface.

12 Claims, 7 Drawing Sheets

(51) Int. Cl.
*B29C 65/54* (2006.01)
*B29C 65/56* (2006.01)
*B29C 65/72* (2006.01)
*B29C 65/00* (2006.01)
*B29C 70/24* (2006.01)
*B29D 99/00* (2010.01)
B29C 65/48 (2006.01)
B29L 31/30 (2006.01)
B64C 3/26 (2006.01)
B64C 1/00 (2006.01)
B29K 63/00 (2006.01)
B29K 307/04 (2006.01)

(52) U.S. Cl.
CPC ... *B29K 2307/04* (2013.01); *B29L 2031/3085* (2013.01); *B64C 3/26* (2013.01); *B64C 2001/0072* (2013.01); *Y02T 50/433* (2013.01); *Y10T 156/10* (2015.01); *Y10T 156/1089* (2015.01); *Y10T 428/24182* (2015.01)

APPARATUS AND METHOD FOR STIFFENERS

CROSS-REFERENCE TO RELATED APPLICATIONS

This application is a National Phase of, and claims priority to, International Application No. PCT/GB2013/052241 filed on Aug. 27, 2013, which claims priority to Great Britain Application No. GB1215361.5 filed on Aug. 29, 2012, each of which applications are hereby incorporated by reference in their entireties.

BACKGROUND

When manufacturing aircraft parts, for example, a section of a wing box upper cover, the upper cover is manufactured with high tolerances. In particular, controlling the surface waviness, the surface finish and the steps and gaps between interfaces of such an upper cover are all important factors because these factors may result in aircraft parts that have poor aerodynamics.

A known method for manufacturing wing covers and similar parts involves co-curing stiffeners to a flat panel to create a monolithic part. However, this method has disadvantages associated with it, such as spring-in and distortion of the part during the curing process, as discussed in more detail below. The distortion can be reduced using standard known techniques. However, for some designs the distortion tolerance is too high for such standard techniques.

Figure 1:
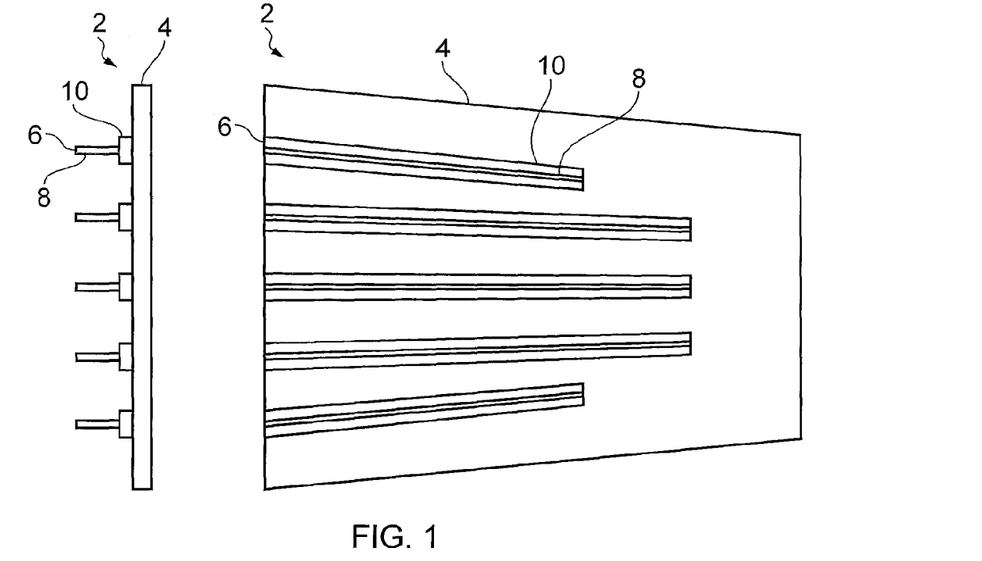
FIG. 1 illustrates a wing cover in cross section on the left and viewed from above on the right.

FIG. 1 illustrates a typical wing cover 2 in cross section on the left and viewed from above on the right. The wing cover 2 is manufactured from carbon fiber reinforced polymer (CFRP) and includes a CFRP wing skin panel 4, stiffened using CFRP T-section stiffeners or stringers 6. The T-section stiffeners 6 are made up of a horizontal or base portion (or foot) 10 and an upright or vertical portion (or blade) 8. The upright portion 8 is substantially perpendicular to the base portion 10.

Figure 2:
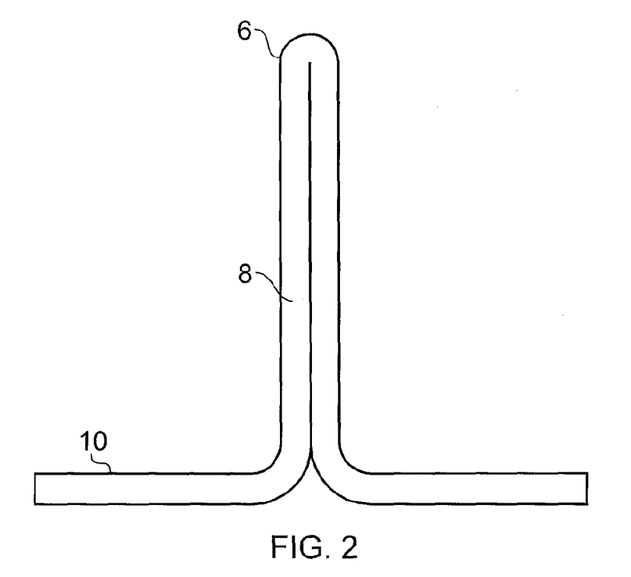
FIG. 2 illustrates a cross section of a T-section stiffener.

FIG. 2 illustrates in cross section a typical T-section stiffener 6. The stiffener includes an upright portion 8 and a base portion 10. The stiffener shown in the figure is produced using a single piece of CFRP that has been roll-formed using known techniques to produce the stiffener shown.

Figure 3:
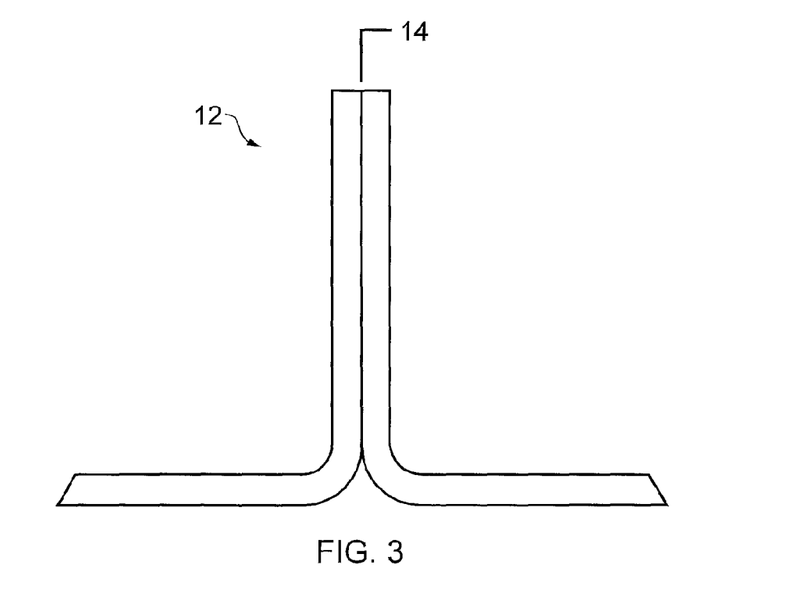
FIG. 3 shows an alternative T-section stiffener in cross section.

FIG. 3 shows an alternative known stiffener 12 that has been manufactured using two L-section stiffeners bonded together along a bond-line 14 using epoxy, for example, to form a T-shape stiffener.

Figure 4:
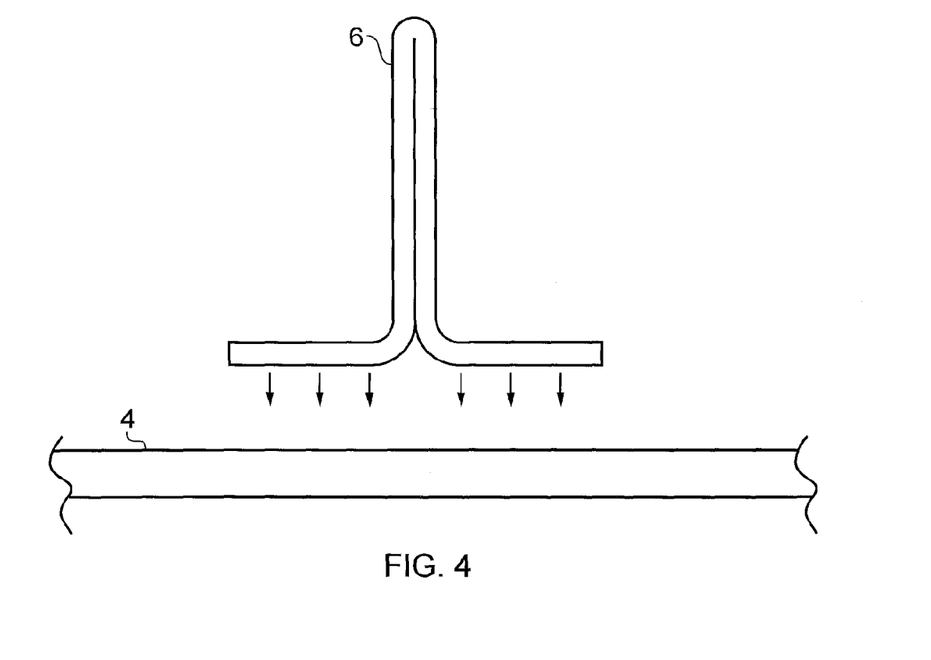
FIG. 4 illustrates a roll-formed stiffener being brought into contact with a panel or skin.

During the manufacture of components using T-section stiffeners attached to the components, there is a tendency for the component to spring or distort during the cure process. FIG. 4 illustrates a roll-formed stringer or stiffener 6 being brought into contact with a panel or skin 4 to be bonded.

Figure 5:
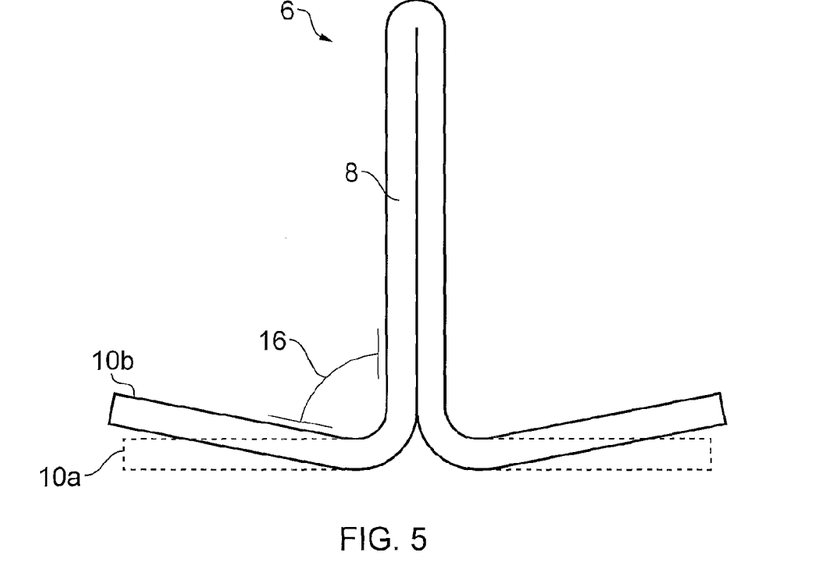
Figure 6:
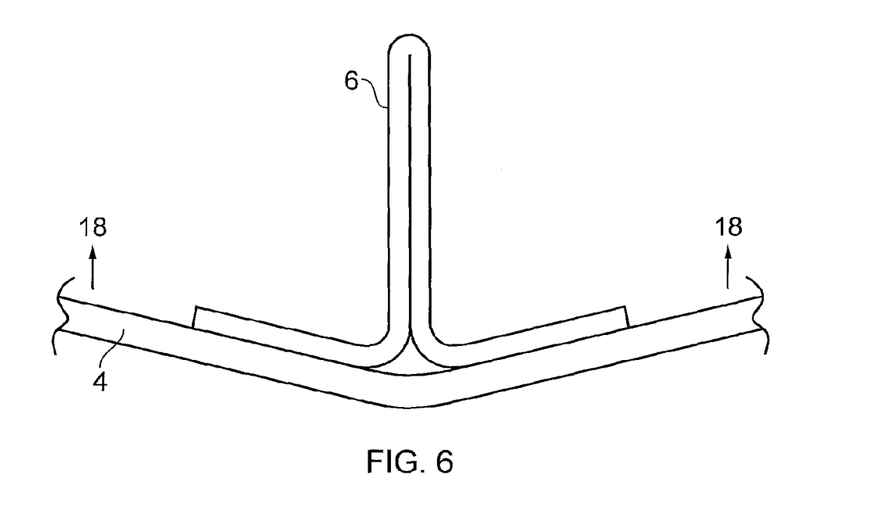

FIG. 5 illustrates a roll formed stiffener 6 with spring-in. T-section stiffeners are known to spring in, due to thermal expansion and the radius of curvature between the foot or horizontal portion 10 and the blade or vertical/upright portion 8. In the figure the spring-in of the foot 10 is illustrated by numeral 10a showing the foot 10 before it is co-cured with no spring-in and 10b after it is co-cured with spring-in. The spring-in angle 16 is illustrated on the figure, but it will be appreciated that the amount of spring-in may be determined by subtracting angle 16 from 90 degrees (i.e., the angle before spring-in). When the skin panel 4 (FIG. 4) and the roll-formed stiffener 6 are co-cured, the spring induced by the stiffener or stringer 6 is transferred into the panel 4, as illustrated in FIG. 6. The effect is that the skin panel 4 is pulled in the direction indicated by arrows 18 in the figure. This pull-in results in surface waviness on the outer mold line of the wing skin. It will be appreciated that the spring-in illustrated in FIGS. 5 and 6 has been exaggerated for illustrative purposes, but is typically between 1 and 5 degrees.

The cause of spring-in is generally attributed to the coefficient of thermal expansion (CTE) of the composite part (e.g. the stiffener), and the CTE properties being orthotropic (i.e., vary in the 3 different axial directions). Indeed, spring-in is observed when the stiffener is unconstrained, as illustrated in FIG. 5.

Figure 7:
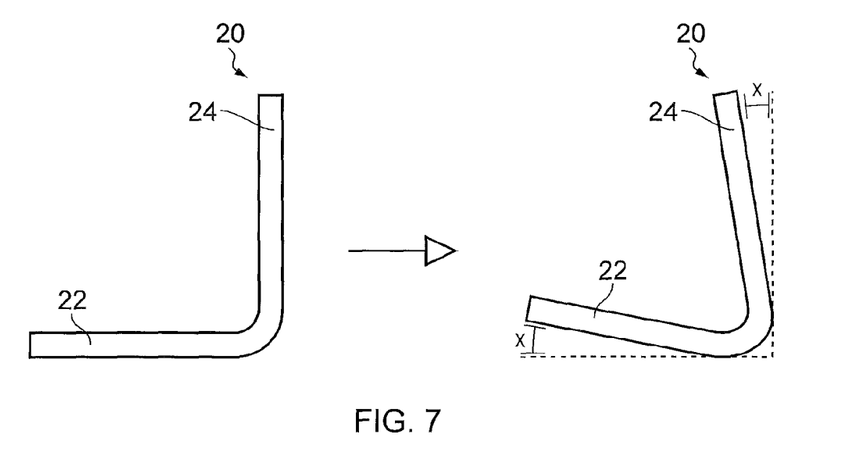
FIG. 7 illustrates an L-section stiffener before being cured on the left hand side and after being cured on the right hand side.

FIG. 7 illustrates an L-section stiffener or stringer 20 before being cured (left hand side) and after being cured (right hand side). The stiffener 20 shown in the figure illustrates the spring-in of the foot or horizontal portion 22 toward the blade or upright portion 24 of the stiffener 20. The amount of spring-in for each of the foot and blade 22, 24 is illustrated as angle "x" in the figure, such that a total spring-in angle of 2x is observed.

Figure 8:
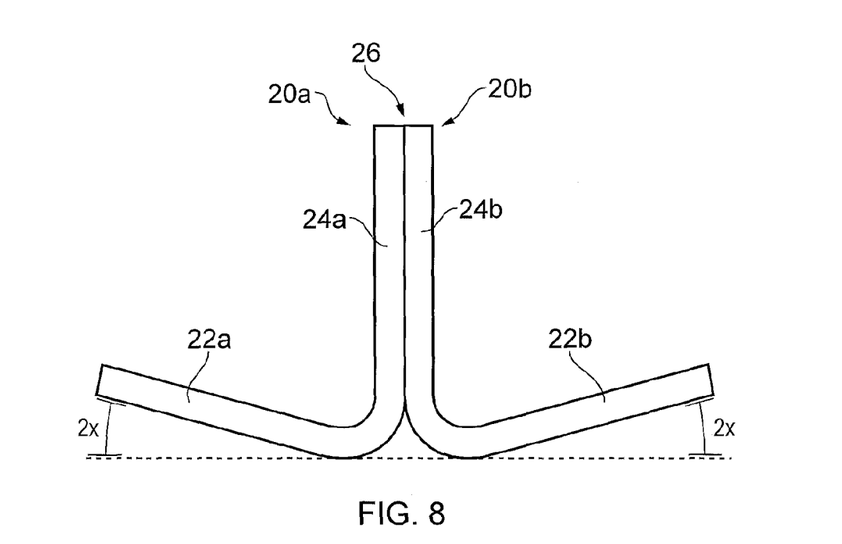
FIG. 8 illustrates two L-section stiffeners positioned back-to-back and co-cured to form a T-section stiffener.

If two L-section stiffeners are positioned back to back or with their respective blades adjacent one another and joined along bond-line 26 (i.e., co-cured, co-bonded or otherwise) to each other to form a T-section, the spring-in that would be experienced by one blade 24a of the L-section stiffener 20a is resisted by the spring-in of the opposing blade 24b of the L-section stiffener 20b. As a result, each blade 24a, 24b remains in its original, upright, position, and it is the stiffener feet 22a, 22b that move upwards to an angle of 2x, as illustrated in FIG. 8. This is observed for T-section stiffeners which are roll-formed or stiffeners formed using back-to-back L-sections.

As discussed above, when a T-section stiffener is co-cured to a flat panel, the movement of the stiffener feet or horizontal portions is transferred to the flat panel, thus pulling the panel in the same direction as the stiffener movement. The effect of the stiffener feet movement may be observed as a profile deviation, or waviness, on the outer mould line face of the flat panel, or for a wing cover, the aerodynamic surface of the cover may be outside allowed tolerances.

Therefore, there is a need to design a stiffener that minimises the amount of spring-in that is transferred to the panel or wing cover by the stiffener. Further, the stiffener preferably should have a single flange or contact surface for attachment to the wing skin.

SUMMARY

Disclosed herein is an apparatus and method for stiffeners.

According to a first aspect of the present disclosure there is provided a method for bonding a stiffener to a surface comprising the steps of: arranging two L-section stiffeners on a surface with their respective upright portions adjacent one another; isolating the upright portions from one another; and bonding the L-section stiffeners to the surface. Thus spring-in associated with stiffeners may be reduced, such that any surface distortion of the panel may also be reduced. Therefore, the surface profile of the opposing surface of the panel (i.e. the surface without the stiffener attached) may be improved which may improve the aerodynamics of the panel.

In accordance with some embodiments each L-section stiffener comprises a curved portion between the upright portion and a horizontal portion, and wherein the respective curved portions are isolated from one another and the surface. The resultant spring-in and distortion on the panel surface may be further reduced if the curved portions of L-section stiffeners or stringers are isolated from one another when the L-shaped stiffeners are bonded to the surface of the panel.

In accordance with some embodiments the horizontal portions of each L-section stiffener are bonded to the surface.

In accordance with some embodiments the method comprises the step of fastening the horizontal portions of each L-section stiffener to the surface, for example, using z-pins. That is to say that the method may comprise a step of strengthening the bond between the horizontal portions of each L-section stiffener and the surface, for example, using z-pins.

In accordance with some embodiments the method comprises the step of introducing a filler, which may be flexible, between the respective upright portions of the L-section stiffeners. The support provided by the stiffener may be further improved if an adhesive or filler is provided between the respective upright portions of the L-section stiffeners after the stiffeners are bonded to the panel surface.

In accordance with some embodiments the upright portions of the L-section stiffener are isolated using a gap, for example an air gap. For example, the upright portions of the L-section stiffener may be isolated using a gap of up to 5 mm (i.e., 0.25, 0.5, 1, 2, 3, 4 or 5 mm).

In accordance with some embodiments the upright portions of the L-section stiffener are isolated using a removable film. Therefore, the isolation between the upright portions is made easier to achieve, since the removable film provides a physical barrier between the upright portions of the L-section stiffeners.

In accordance with some embodiments the upright portions of the L-section stiffener are isolated using a removable preformed structure. Thus it is possible to more easily isolate the upright portions in a consistent manner, since a preformed structure can be manufactured with a predetermined geometry for the specific application.

In accordance with some embodiments the preformed structure is located between the upright portions of the L-section stiffeners and the surface.

In accordance with some embodiments the surface is an inner surface of a panel and the panel may be an aircraft wing skin.

In accordance with some embodiments the L-section stiffeners are bonded to the surface using an epoxy.

In accordance with some embodiments the L-section stiffeners are simultaneously bonded to the surface.

According to a second aspect of the present disclosure there is provided an apparatus comprising: a panel; and two L-section stiffeners bonded to a surface of the panel with their respective upright portions adjacent one another and isolated from one another.

In accordance with some embodiments each L-section stiffener comprises a curved portion between the upright portion and a horizontal portion and the respective curved portions are isolated from one another and the surface.

In accordance with some embodiments the horizontal portions of the L-section stiffener are bonded to the surface.

In accordance with some embodiments the horizontal portions of each L-section stiffener are fastened to the surface of the panel.

In accordance with some embodiments the apparatus comprises a filler, which may be flexible, located between the respective upright portions of the L-section stiffeners.

In accordance with some embodiments the apparatus comprises a gap, for example an air gap, located between the respective upright portions of the L-section stiffeners.

In accordance with some embodiments the apparatus comprises a removable film located between the respective upright portions of the L-section stiffeners.

In accordance with some embodiments the apparatus comprises a removable preformed structure located between the respective upright portions of the L-section stiffeners.

In accordance with some embodiments the preformed structure is located between the uprights of the L-section stiffeners and the surface.

In accordance with some embodiments the surface is an inner surface of a panel.

In accordance with some embodiments the panel is an aircraft wing skin.

In accordance with some embodiments the L-section stiffeners are bonded to the surface using an epoxy.

BRIEF DESCRIPTION OF THE DRAWINGS

For a better understanding of the subject matter disclosed herein, and to show how the same may be carried into effect, reference is now made by way of example to the accompanying drawings in which:

FIG. 5 illustrates a roll-formed stiffener with spring-in.

FIG. 6 illustrates a panel and a co-cured roll-formed stiffener with spring-in;

DETAILED DESCRIPTION

The term bonding is used throughout and is used to generally describe joining parts using heat and/or adhesive and/or pressure. This may include secondary bonding, co-bonding and co-curing. Secondary bonding will be understood to be performing the steps of joining together two or more pre-cured parts (i.e. composite parts) using adhesive bonding such that the chemical or thermal reaction that takes place is the curing of the adhesive. In other words the pre-cured parts do not undergo any chemical or thermal reaction. Co-bonding will be understood to be performing the steps of simultaneously curing two or more elements, including at least one fully cured element and at least one uncured element. Co-curing will be understood to be performing the steps of curing a composite and simultaneously bonding it to another uncured material. Furthermore, the terms horizontal and vertical/upright are used throughout to identify the relative orientations of the various described elements or portions that are generally perpendicular to one another. However, it will be appreciated that the terms horizontal and vertical/upright are not limiting to the absolute orientation of the various described elements or portions. For example, the upright portions, which are generally perpendicular to the horizontal portions, may have an absolute vertical orientation. More generally, the upright or vertical portion is the portion of a stiffener that extends away from a surface in a generally perpendicular direction and the horizontal portion is the portion of a stiffener that is bonded to the surface.

Figure 9:
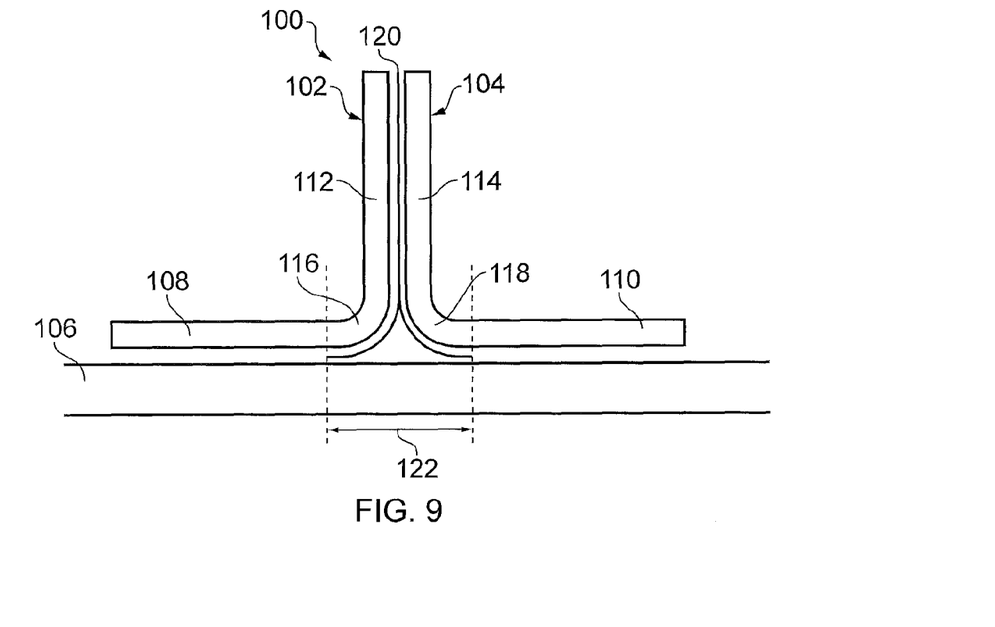
FIG. 9 illustrates schematically a cross section of a stiffener according to an embodiment.

FIG. 9 illustrates schematically a cross section of a stiffener 100 according to an embodiment. The stiffener or springer 100 comprises two L-section stiffeners 102, 104. Each L-section stiffener is manufactured from carbon fiber reinforced polymer (CFRP) and is approximately 10 cm high and 20 cm wide with a thickness of 5 mm. The length of the stiffener depends on the application, but may be in the region of 10 to 15 meters and may be greater than 15 meters or less than 10 meters. However, it will be appreciated that embodiments of the invention are not limited to the L-section stiffeners described in this example and may be of any size depending on the application. The polymer used in this example is epoxy, but other polymers, such as polyester, vinyl ester or nylon may be used. Carbon fiber is used in this example, but other fibers such as Kevlar, aluminium, or glass fibers may be used. In the figure the stiffener 100 is arranged on a surface of a panel 106. The panel 106 in this example is a wing cover or wing skin. In particular, the stiffener is arranged on an inner surface of the panel 106. It will be appreciated that other aerospace parts may also be manufactured in this way. Furthermore, this technique may be used for other parts involving the strengthening of a skin or panel. The skin 106 is manufactured from CFRP and has a thickness of 10 mm, but it will be appreciated that other thicknesses may be used.

The L-section stiffeners 102, 104 comprise a foot, base or horizontal portion 108, 110, which is the part of the stiffener that is attached to a surface, and a blade, upright or upstanding portion 112, 114, which extends perpendicular to the foot 108, 110. Each L-section stiffener 102, 104 is made as a single piece, typically using a mold, for example, so that a curved portion 116, 118 joins the foot 108, 110 and blade 112, 114. That is to say that the curved portion 116, 118 goes from the foot 108, 110 to the blade 112, 114. The two L-section stiffeners 102, 104 are arranged such that the uprights 112, 114 of the stiffeners are adjacent or back-to-back to one another, as illustrated in the figure.

A piece of release film 120 having a thickness of approximately 1 mm or less (e.g., 0.1, 0.2, 0.3, 0.4, 0.5, 0.6, 0.7 0.8, 0.9, or 1 mm) is placed or arranged between the upright portions 112, 114 of the L-section stiffeners 102, 104. Preferably, and as illustrated, the release film 120 extends between the two stiffeners 102, 104 and continues to the curved portions 116, 118 of the stiffeners. It will be appreciated that this is achieved using two release films, one for each stiffener. Indeed, as illustrated, the release film terminates at the end of the curved portion 116, 118 which coincides with the beginning of the foot 108, 110. The foot of the L-shaped stiffener being the part of the stiffener that is brought in contact with the skin or panel and being the part of the L-shaped stiffened that is not curved. The release film in this example is Polytetrafluoroethylene (PTFE). However, other materials may be used that prevent the two stiffeners being bonded together, e.g., Perfluoroalkoxy (PFA) or Fluorinated ethylene propylene (FEP). The extent 122 of the release layer is illustrated in the figure by the two dashed vertical lines. The release film generally provides a barrier between the upright portions of the L-section stiffeners to prevent the upright portions being bonded together.

Figure 10:
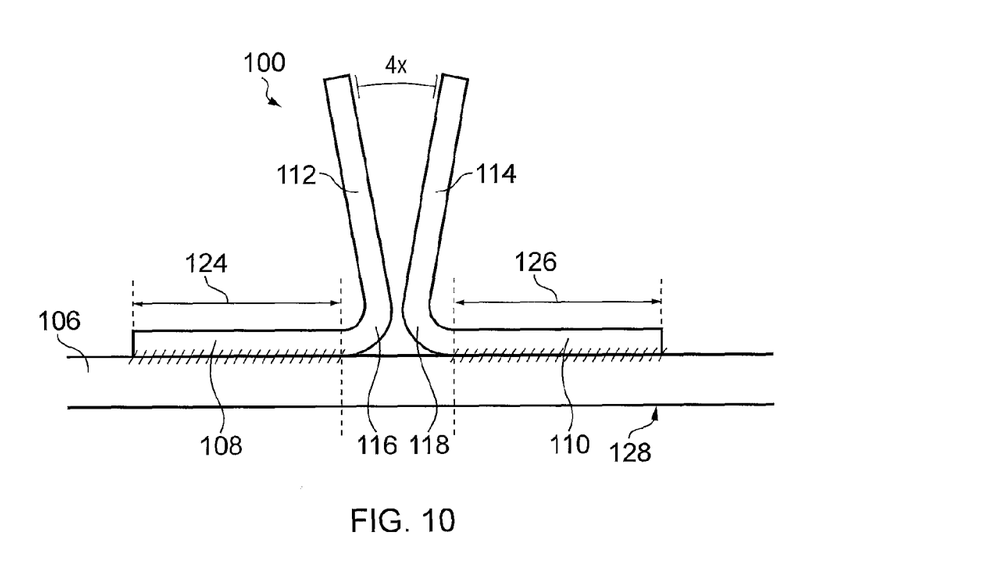
FIG. 10 illustrates schematically the L-section stiffeners shown in FIG. 9 after being co-cured.

FIG. 10 illustrates, in cross section, the stiffener 100 after it has been bonded to the panel 106. The bonding process uses a polymer (e.g., epoxy, polyester, vinyl ester or nylon) that is applied to the foot 108, 110 of the stiffener 100 (which comprises the two horizontal portions 108, 110 of the two L-section stiffeners 102, 104) and to the surface of the panel 106. The stiffener 100 and the panel 106 are then brought together and the two parts are co-cured. The two L-section stiffeners 102, 104 are preferably bonded to the panel 106 simultaneously. After the parts are co-cured, the release layer or film is removed, but may also be left in place. Pressure and/heat or may also be applied to the stiffener during the curing process to improve the bonding.

In the figure the extent 124, 126 of the bonding between the stiffeners 102, 104 and the skin 106 is illustrated by the hatched lines. As can be seen, the upright portions or blades 112, 114 are not bonded, nor are the curved portions 116, 118. As discussed in the introduction, when the L-section stiffeners are cured, each of the feet or horizontal portions 108, 110 and the blades or upright portions 112, 114 move toward one another or spring-in by an amount "x".

That is to say that when the L-section stiffeners are cured, the angle between each of the feet or horizontal portions 108, 110 and the blades or upright portions 112, 114 decreases by an amount "x". Thus, as illustrated in the figure, when the stiffeners 102, 104 are constrained at the base portion 108, 110, the two uprights or blades 112, 114 move apart by an amount of 2x. However, no movement of the feet 108, 110 of the L-section stiffeners 102, 104 is observed. This results in a stiffener that is split along its blade centerline, but without the feet being distorted. Consequently the outer surface 128 of the skin 106 is not distorted by the stiffener 100.

Figure 11:
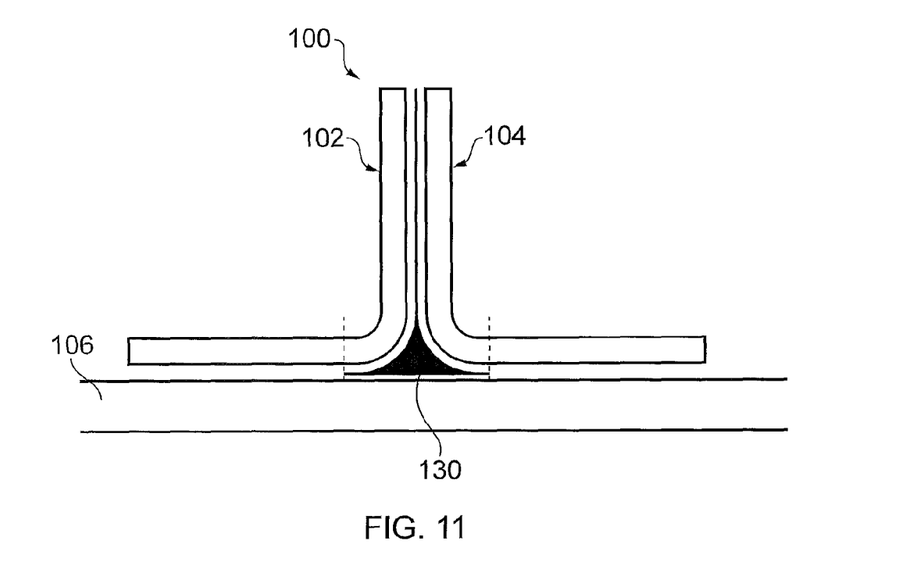
FIG. 11 illustrates schematically in cross section a stiffener and skin according to a further embodiment before the stiffener and skin are co-cured.

FIG. 11 illustrates in cross section a stiffener 100 and skin 106 according to a further embodiment before the stiffener 100 and skin 106 are co-bonded or co-cured. The same reference numerals are used to identify common features in FIG. 11 as used in FIG. 9. In FIG. 11, the release film is replaced by a single molding or noodle 130. The molding is manufactured from or made of PTFE and allows better control and reproducibility of the bonding process. This is because the molding or noodle 130 can be reproduced repeatably with the same dimensions and tolerances separately from the bonding process such that the spacing between the skin 106 and the stiffener 100 can be reproduced using the molding 130.

Figure 12:
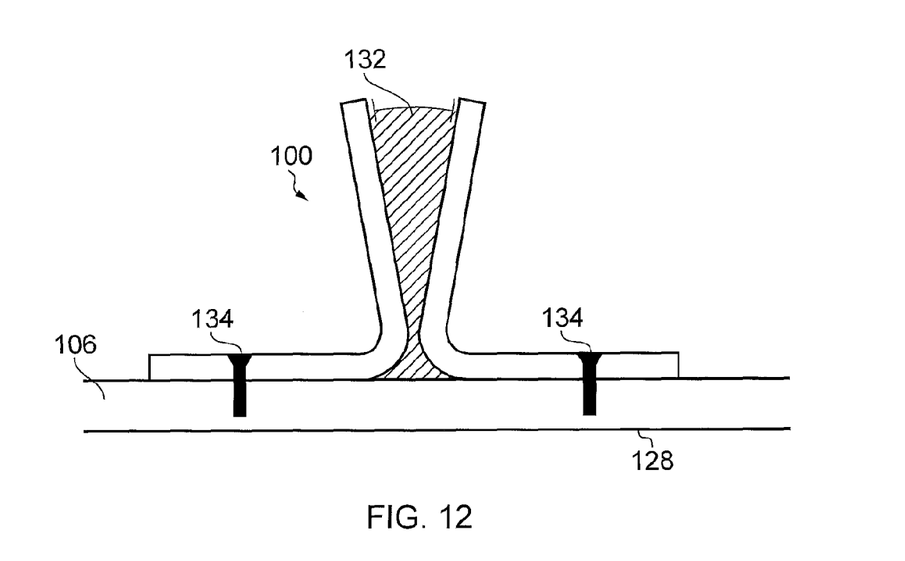
FIG. 12 illustrates schematically in cross section a stiffener and skin according to a further embodiment after the stiffener and skin are co-cured including a filler and fasteners.

FIG. 12 illustrates in cross section a stiffener 100 and skin 106 according to a further embodiment after the stiffener 100 and skin 106 are co-bonded or co-cured. In the figure the release film 120 or noodle 130 have been removed and the gap is filled with an adhesive filler 132 or shim, e.g., Henkel Hysol EA 9377, but it will be appreciated that the skilled person could select any filler/adhesive taking into account the likely loading that will be experienced by the stiffener. The filler 132 may be flexible to allow movement of the two uprights or blades. Fasteners or strengtheners 134 are also used in this example to further attach the stinger or stiffener 100 to the skin 106. That is to say that fasteners or strengtheners 134 may be used to increase the strength of the bond between the stinger or stiffener 100 and the skin 106 (i.e., make it more difficult to separate the stinger or stiffener 100 and the skin 106). The fasteners in this example are z-pins and preferably do not extend to the opposite or outer surface 128 of the skin 106. The use of z-pins or z-fibers, which may be referred to as z-pinning, is a known technique of inserting reinforcing fibers in a z-direction with respect to the surface of the part. The z-pins may also be manufactured from metal or pre-cured unidirectional composite fibers.

In an alternative embodiment, an air gap of up to 5 mm (i.e., 0.25, 0.5, 1, 2, 3, 4 or 5 mm) is provided between the upright portions of the L-section stiffeners to isolate the upright portions of the respective L-shaped stiffeners.

Figure 13A:
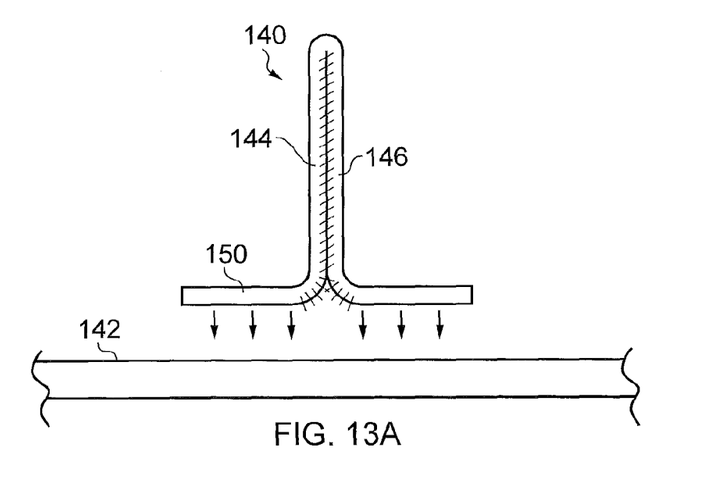
FIGS. 13A, 13B and 13C illustrate schematically a method for bonding a stiffener to a skin according to a further embodiment.
Figure 13B:
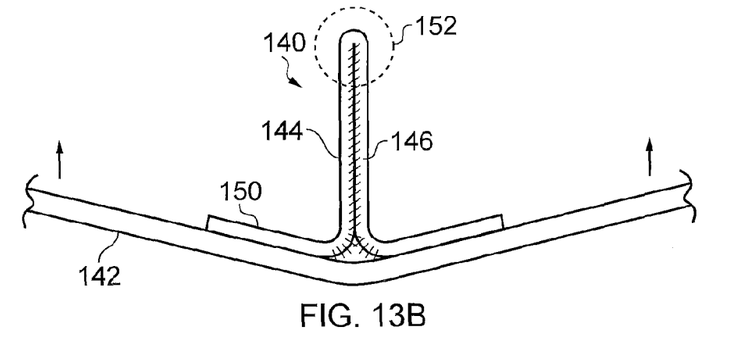
Figure 13C:
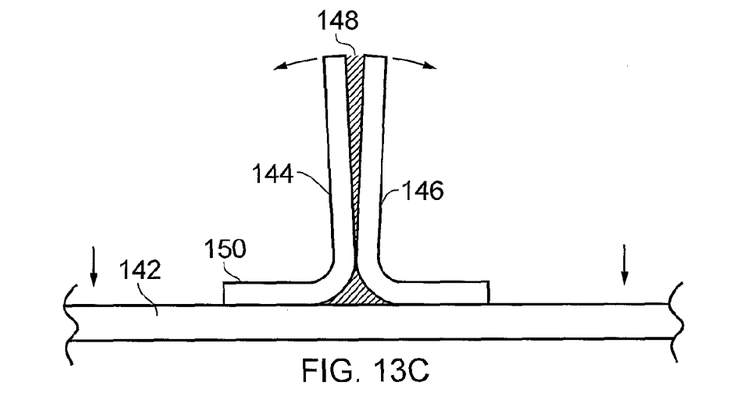

FIGS. 13A, 13B and 13C illustrate schematically a method for bonding a stiffener to a skin according to a further embodiment of the invention. FIG. 13A illustrates a T-section stiffener 140 that has been formed using known roll forming techniques. During the process of roll forming the stiffener 140, a release layer or film 148 is arranged or positioned between two uprights portions 144, 146 of the stiffener 140. The isolation film or layer 148 corresponds to the release film 120 described in association with FIG. 9 and is illustrated by diagonal hatching in the figure. A base portion, generally perpendicular to the upright portions 144, 146 is brought in to contact with a surface (i.e., an inner surface) of a panel 142 and is co-bonded, as described above.

FIG. 13B illustrates the stiffener 140 and panel 142 after the bonding procedure has been completed. As is illustrated in the figure, the panel 142 is distorted because of the spring-in of the stiffener 140 resulting from the co-bonding process, as illustrated by the upward arrows in the figure. In this embodiment, a curved end portion 152 that couples each upright portion 144, 146 is removed, using known techniques. That is to say that a distal end 152 (i.e., an end of the upright portions furthest away from the base 150) of the upright portions 144, 146 of the stiffener 140 is removed. As is illustrated in FIG. 13C, by removing a coupling portion 152 (distal end) of the respective upright portions 144, 146, the uprights portions 144, 146 move away from one another, thus alleviating the spring-in and the distortion of the panel, as indicated by the arrows in the Figure. In an alternative embodiment the distal end 152 of the upright portions 144, 146 is removed before the co-bonding process. Furthermore, the release film 148 may be removed and may be replaced by a filler or flexible filler, as described for other embodiments.

It will be appreciated that various embodiment and aspects of the embodiment may be combined.

Accordingly, a method for bonding a stiffener to a surface (i.e. a panel surface) is described. The method comprising the steps of: arranging an isolation layer between two adjacent upright portions of a T-section stiffener, and arranging the stiffener on a surface and bonding the stiffener to the surface.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e. meaning "might") rather than the mandatory sense (i.e., meaning "must"). Similarly, the words "include", "including", and "includes" mean including, but not limited to.

The invention claimed is:

1. A method for bonding a T-section stiffener to a surface, comprising:
    arranging an isolation layer between two adjacent upright portions of the T-section stiffener, the T-section stiffener comprising two L-section stiffeners, each L-section stiffener comprising a curved portion that joins one of the upright portions and a horizontal portion, the isolation layer being removable from between the L-section stiffeners, wherein the isolation layer prevents the L-section stiffeners from being bonded directly together;
    arranging the T-section stiffener on the surface; and
    bonding the T-section stiffener to the surface.

2. The method of claim 1, wherein distal ends of the upright portions of the T-section stiffeners are coupled to one another, the method further comprising removing the coupled distal ends of the upright portions to release the upright portions.

3. The method of claim 2, where the T-section stiffener is roll formed and the isolation layer is arranged between the two adjacent upright portions of the T-section stiffener during the roller forming.

4. The method of claim 1, wherein the isolation layer extends to respective curved portions to isolate the curved portions from one another and the surface.

5. The method of claim 4, wherein horizontal portions of the stiffener are bonded to the surface.

6. The method of claim 4, further comprising fastening horizontal portions of respective L-section stiffeners included in the T-section stiffener to the surface.

7. The method of claim 1, further comprising introducing a filler between the respective upright portions of the stiffener after the stiffener has been bonded to the surface.

8. The method of claim 1, wherein the isolation layer is one of an air gap, a removable film, and a removable preformed structure.

9. The method of claim 1, wherein isolation layer is a removable preformed structure that is located between the upright portions of the stiffener and the surface.

10. The method of claim 1, wherein the surface is an inner surface of a panel.

11. The method of claim 10, wherein the panel is an aircraft wing skin.

12. The method of claim 1, wherein the stiffener is bonded to the surface using an epoxy.

* * * * *